United States Patent [19]

Lunt et al.

[11] Patent Number: 5,775,733
[45] Date of Patent: Jul. 7, 1998

[54] AIRBAG CUSHION FOLDING PROCESS

[75] Inventors: Larry F. Lunt, Brigham; Russell L. Rose, Tremonton, both of Utah

[73] Assignee: Autoliv ASP, Inc., Ogden, Utah

[21] Appl. No.: 852,177

[22] Filed: May 6, 1997

[51] Int. Cl.$^6$ ................................................ B60R 21/20
[52] U.S. Cl. .................... 280/743.1; 53/120; 493/451; 493/458
[58] Field of Search ...................... 280/743.1, 732; 53/120, 429, 117; 493/451, 458, 406, 405, 940

[56] References Cited

U.S. PATENT DOCUMENTS

| | | | |
|---|---|---|---|
| 4,235,453 | 11/1980 | Lawson et al. | 280/743.1 |
| 5,162,035 | 11/1992 | Baker | 493/405 |
| 5,163,893 | 11/1992 | Hara et al. | 493/458 |
| 5,300,011 | 4/1994 | Budde et al. | 493/405 |
| 5,360,387 | 11/1994 | Baker | 493/405 |
| 5,375,393 | 12/1994 | Baker et al. | 53/429 |
| 5,398,968 | 3/1995 | Emambakhsh et al. | 280/743 |
| 5,493,846 | 2/1996 | Baker et al. | 53/429 |
| 5,591,489 | 1/1997 | Folsom et al. | 280/743.1 |
| 5,613,348 | 3/1997 | Lunt et al. | 53/429 |
| 5,636,860 | 6/1997 | Fischer et al. | 280/730.1 |

*Primary Examiner*—Christopher P. Ellis
*Attorney, Agent, or Firm*—George W. Rauchfuss, Jr.

[57] ABSTRACT

The process comprises the steps of gripping top and bottom boundaries of the face portion of the main panel of the cushion and pulling it so that the front face portion is generally planar and the side panels extend generally outward from the canister. First and second folding combs move inward from the opposite sides of the cushion. From the front a third folding comb moves rearward. Plates of the combs interdigitate with portions of the cushion inbetween, thus creating accordion folds. Fourth and fifth folding combs move in from the sides and their plates interdigitate with the plates of the other three combs, tucking excess portions of the cushion inbetween the accordion folds already formed. The package thus formed is compressed and then moved into the canister. A dust cover is slid over the front of the canister.

10 Claims, 7 Drawing Sheets

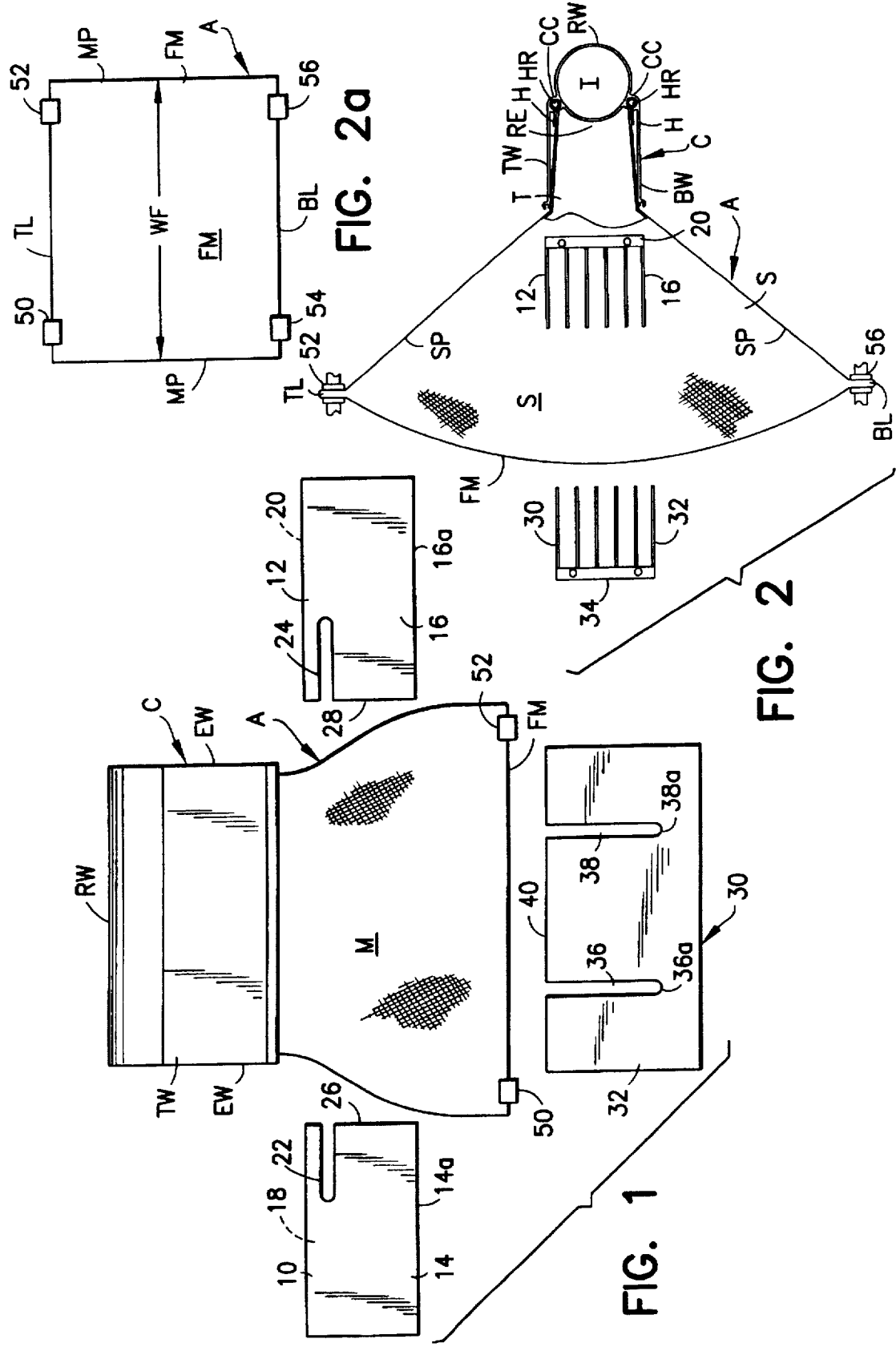

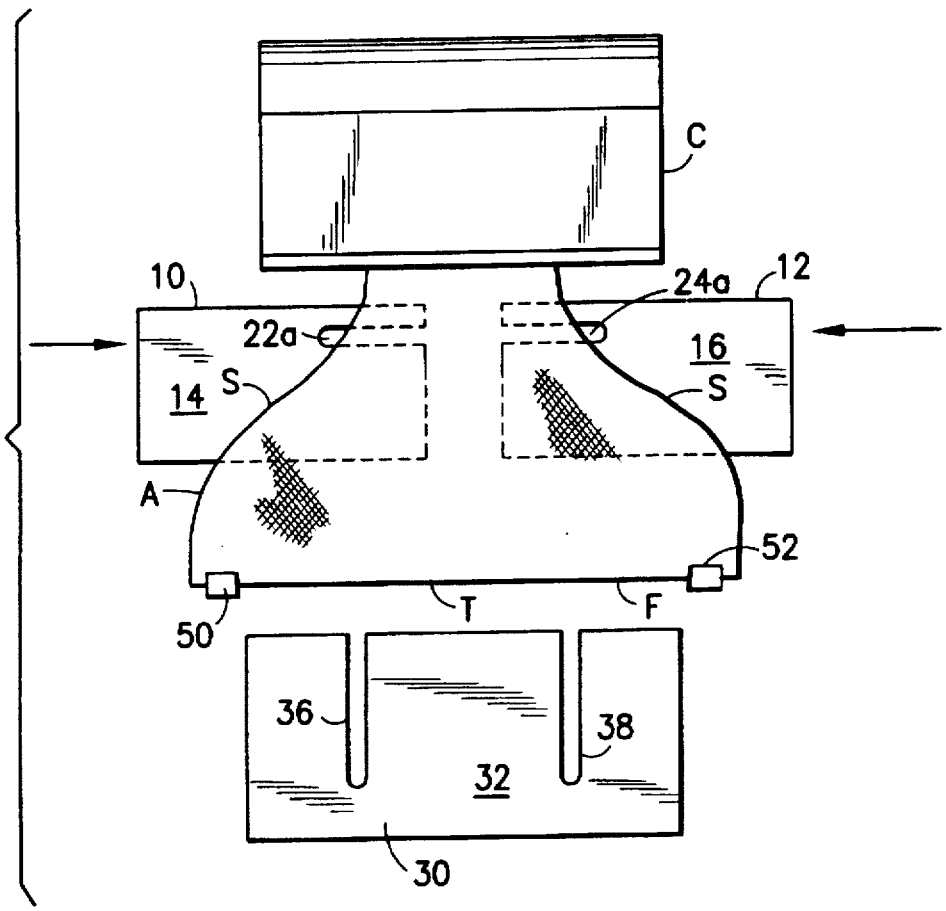
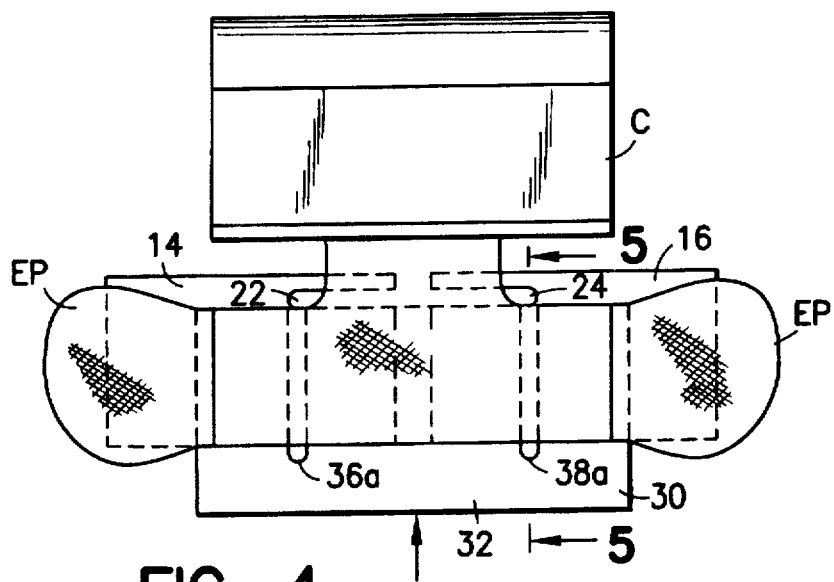

AIRBAG CUSHION FOLDING PROCESS

FIELD OF THE INVENTION

This invention relates to the folding of flexible bags. More specifically, the invention relates to the folding of airbag cushions to be used as safety restraints in vehicles.

BACKGROUND OF THE INVENTION

With the growing numbers of airbags as safety restraints, there is a need to provide a readily automatable folding operation which would produce a folded package which unfolds evenly with a minimum of oscillation and stress.

Prior attempts at folding processes have resulted in folded cushions which, on deployment, have oscillated from side-to-side. This has been due to the fact that some areas of the cushion have been folded in accordion folds while other areas have been rolled. In deployment there is an unevenness. For instance, for some current folded cushions, one of the last folding operations is a roll. As a consequence, the rolled portion is one of the first portions of the fold that comes out in the deployment. This creates high stress and strain on the cushion material, throat, tether and other seams on the cushion. In addition, current passenger airbag cushions generally unfold in a prescribed sequence, i.e. flap opens, bag unrolls, side pleats/folds unfold and cushion completes the filling process. During this sequence the bag oscillates because of the configuration it is in during each stage of the unfolding process.

There is a need for a folding process which allows the airbag to deploy as a whole instead of in a segmented unfolding process. The deployment characteristics of the fold should provide protection to the occupant firstly, distribute the loading throughout the cushion more evenly, reduce the breakout force and pressure needed to deploy the bag and considerably reduce the oscillation of the cushion during deployment.

SUMMARY OF THE INVENTION

Briefly, this invention is a method for folding an inflatable airbag cushion disposed in a rigid canister. The canister has top and bottom sidewalls, and opposite end walls and a rear wall formed with a fluid opening adjacent an inflator. The cushion has side panels and a main panel joined to edges of the respective side panels and defining an open mouth of the cushion mounted around the fluid opening, such as, for example, by rods in the mouth of the airbag being disposed in channels on either side of the fluid opening.

The process comprises the steps of gripping the main panel from the top and bottom at spaced-apart locations and pulling the main panel so that a front face portion thereof is disposed in a generally planar shape parallel to the fluid opening of the canister, with the side panels of the airbag extending generally outward from the canister in respective planes. First and second folding combs are disposed on opposite sides of the cushion and are moved inward to indent the respective side panels. The folding combs each comprise a group of parallel vertically aligned, spaced, horizontal plates. A third folding comb also comprises a group of vertically aligned, spaced, horizontal plates and is placed in front of the generally planar shaped portion of the main panel. The third folding comb is moved toward the canister. The plates of the third folding comb interdigitate with the plates of the first and second folding combs with portions of the face portion and side panels of the airbag folded inbetween the interdigitating plates in accordion folds.

The first, second and third folding combs are backed off slightly and the partly folded cushion is inflated to a slight extent. Fourth and fifth folding combs, each comprising a group of vertically aligned, spaced, horizontal plates, next move in from the respective sides of the cushion and interdigitate with the plates of the other two folding combs, i.e. the fourth comb with the first and third combs and the fifth comb with the second and third combs, tucking inwardly excess portions of side panels of the cushion, which excess portions are disposed laterally of the already folded portions.

The folded package thus formed is compressed or compacted by upper and lower compression plates having pins which straddle the package and carry elastic compression strips. The combs are all withdrawn. The compression plates then effect compaction of the folded airbag. The compressed package is then moved rearward into the canister and a dust cover is slid sideways over the front of the canister.

Summarized more broadly, the invention is a method for folding an inflatable airbag cushion having an inflation opening therein, the cushion secured about the inflation opening to a canister, the cushion comprising a main panel extending forward from the canister to a face portion, and back to the canister, and side panels secured to respective side margins of the main panel. The folding method comprises the steps of gripping the main panel at spaced points along the width of the face portion and pulling the face portion taut and in a direction away from the canister. The method includes the further step of folding the face portion and side panels adjacent the face portion into accordion pleats parallel to the width of the face portion and leaving excess portions of the cushion at either end of the pleats; tucking the excess portions inbetween the respective accordion pleats to form a folded package of the airbag cushion; and compressing and inserting the folded package into the canister.

BRIEF DESCRIPTION OF THE DRAWINGS

Other objects and features of the invention will be apparent to those skilled in the art from a study of the following specification with reference to the drawings, all of which disclose a non-limiting embodiment of the invention. In the drawings:

FIG. 1 is a top plan schematic view of an airbag assembly including cushion and canister with first, second and third folding combs at the beginning of the process;

FIG. 2 is a right side elevation of the arrangement of FIG. 1;

FIG. 2a is a reduced front elevational view of the face portion of the cushion;

FIG. 3 is a top plan schematic view of an airbag assembly with the first and second folding combs moved inward from the sides;

FIG. 4 is a top plan schematic view of an airbag assembly with the third folding comb moved rearward from the front;

DESCRIPTION OF THE PREFERRED EMBODIMENT

FIG. 1 discloses an airbag canister C. The canister C comprises (FIGS. 1 and 2) top TW and bottom BW sidewalls and connected end walls EW. A rear wall RW has an inflator I installed therealong. An airbag cushion A comprises a main panel M and side panels S having their respective peripheries MP and SP connected. The main panel has a face portion FM having a width WF (FIG. 1) and top boundary line TL and bottom boundary line BL (FIGS. 2, 2a).

Figure 12:
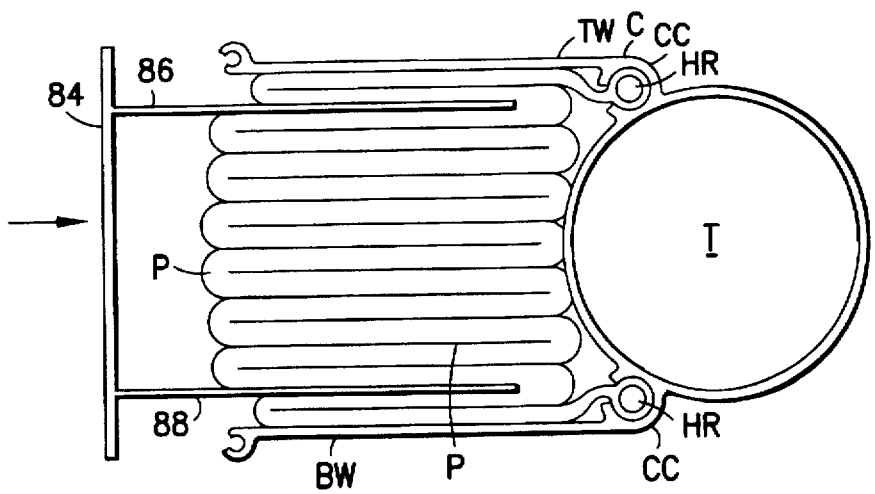
FIG. 12 is a sectional view similar to FIG. 11 but with the insertion blades having moved rearward, inserting the folded cushion into the canister.

The rearward end portions of the main panel M and side panels S of the airbag cushion A form an inflation throat T which extends into the canister C and their end edges are doubled back and sewn to form hems H therealong, the hems receiving retaining rods HR. The retaining rods HR are clamped to the rear wall RW of the canister C in C-shaped slotted channels CC (FIGS. 2, 12). The rear end RE of the throat T is thus firmly secured in the canister C in a way well known in the art. The hems H flank the inflator I so that, when activated, the inflator discharges inflation gas into the airbag cushion A.

On opposite sides of the airbag cushion A are folding elements comprising the first and second folding combs 10 and 12. These combs 10, 12 each comprise a group of vertically aligned, spaced, horizontal plates 14, 16 as shown in FIGS. 1 and 2. The plates 14, 16 are held firmly by respective spines 18, 20. As shown (FIG. 1), the first and second folding combs 10 and 12 are each formed with respective longitudinal slots 22, 24 in their plates 14 and 16, with the slots extending laterally outward from the inner margins 26 and 28 of the plates, i.e. the margins facing the airbag cushion A.

A third folding comb 30 is disposed in front of the airbag cushion A and also comprises a group of vertically aligned, spaced, horizontal plates 32 held in spaced relation by a spine 34 (FIG. 2). As shown in FIG. 1, the third folding comb 30 is formed with spaced rearward slots 36, 38 in each of plates 32, with the slots extending forward from the respective rear edges 40 of the plates 32, i.e. the edges of the plates facing airbag cushion A.

At the commencement of the process, the airbag cushion A (FIG. 2) is gripped from top boundary line TL and bottom boundary line BL, preferably at spaced points along its width WF, by gripping means 50, 52, 54 and 56, shown schematically (FIG. 2a). The gripping may, of course, be done at spaced points at the corners of the face F instead of along the width WF, but the latter is preferred. The gripping means 50, 52, 54, 56 pull the main panel of the airbag cushion A so that its front face portion FM is in a generally flat to slightly convex configuration and the side panels S extend laterally outward from the canister C in a generally planar shape.

In the process of the invention, the first and second folding combs 10, 12 move inward from the sides (FIG. 3), indenting the side panels S and take up closely spaced positions adjacent each other. The plates 14 of comb 10 are horizontally aligned with the plates 16 of comb 12. This indenting pulls inward the side panels S and top and bottom portions of the main panel M so that the fabric is necked in, as seen from above, making visible the ends 22a, 24a of the slots 22, 24 (FIG. 3). The spaced parallel plates 14, 16 of first and second combs 10, 12 face forward, with the plates 32 of the third folding comb 30 being aligned with the spaces between the plates 14, 16 of the first and second folding combs 10, 12.

At this point the third folding comb 30 moves rearward towards the canister C (FIG. 4), indenting the face portion FM of the cushion A and extending inward so that the plates 14, 16 of the first and second combs 10, 12 interdigitate with the plates 32 of the third comb 30. The gripping means 50, 52, 54 and 56 (FIG. 2a) release. This zig-zags or weaves the face portion FM of the main panel M and the side panels S of the airbag cushion A inbetween plates 32 of the third comb 30 and the plates 14, 16 of the first and second combs 10, 12 to form accordion pleats AP as shown generally in FIG. 5. Preferably as shown, the interdigitation is limited so that the forward edges 14a and 16a of the plates 14, 16 of the first and second combs 10, 12 leave the fabric of the airbag cushion short of the inner ends 36a, 38a of the slots 36, 38, and the inner ends 36a, 38a are visible from above (FIG. 4) so that compaction pins may extend down through the slots outside the folded cushion, as will be explained.

In the next step, the first and second folding combs 10, 12 and the third folding comb 30 are backed off relative to each other for a short distance. This retreating, shown having been done in FIGS. 5 and 6, makes room for the partial slight inflation of the folded portion of the airbag cushion A. Air under mild pressure, for instance, 20 psi, is introduced into the cushion A to slightly inflate the folded cushion portions disposed between the plates 14, 16 and 32 of the folding combs 10, 12 and 30 respectively.

Figure 7:
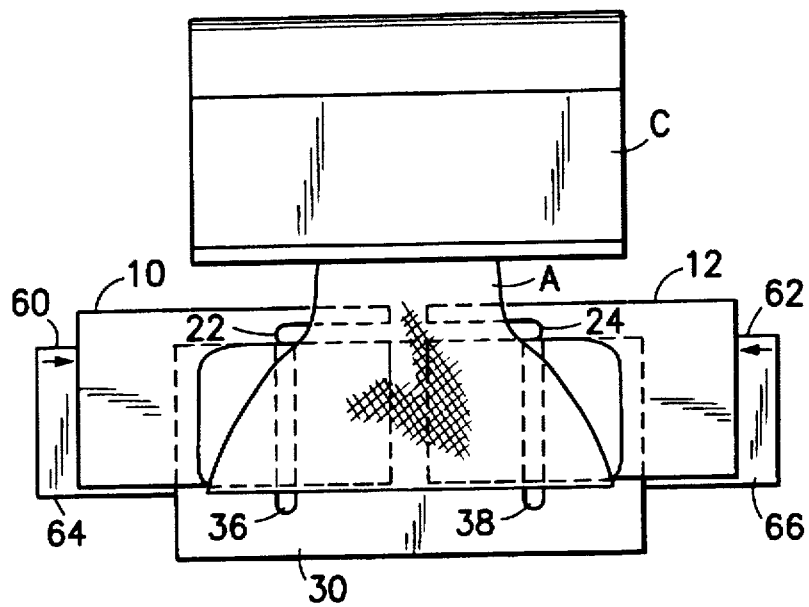
FIG. 7 is a top plan schematic view of an airbag assembly with the fourth and fifth folding combs moved inward from the sides.

FIG. 4 discloses that while center portions of the face portion FM of the main panel M of the cushion are neatly folded in accordion pleat fashion, excess portions EP comprising the side panels S and some side portions of the main panel M bellow outward and contrast with the neatness of the folded portion. Referring now to FIG. 7, fourth and fifth folding combs 60, 62 which have been disposed at either side of the partly folded cushion (which combs 60, 62 are not shown in previous views to avoid unnecessarily complicating the views), and each comprising a group of vertically aligned, spaced, horizontal plates 64, 66, now move inward towards each other. The plates 64, 66 of the fourth and fifth folding combs 60, 62 are arranged to interdigitate with the plates 14, 16 of both the first and second folding combs 10 and 12 and the plates 32 of the third folding comb 30.

In moving inward, the fourth and fifth folding combs 60, 62 engage the excess portions EP of the cushion which, because of the partial inflation and the support from the combs 10, 12 and 30, extend outward in a way to be accessible to the fourth and fifth folding combs 60, 62.

Figure 5:
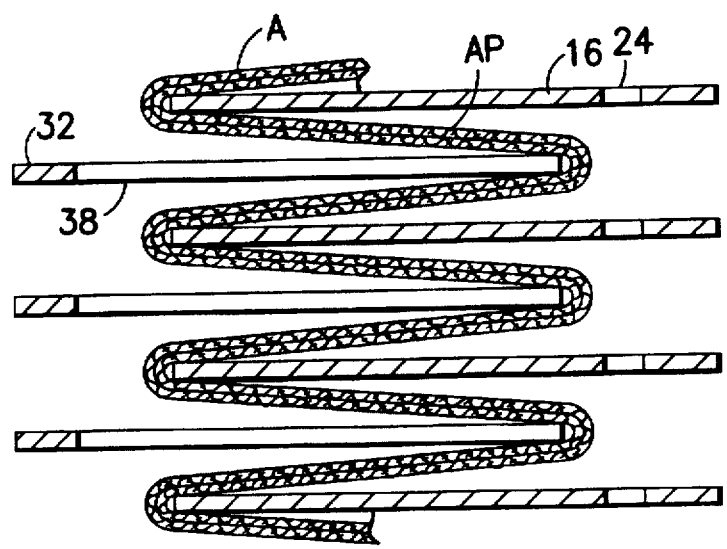
FIG. 5 is an enlarged fragmentary sectional view taken on the line 5—5 of FIG. 4.
Figure 6:
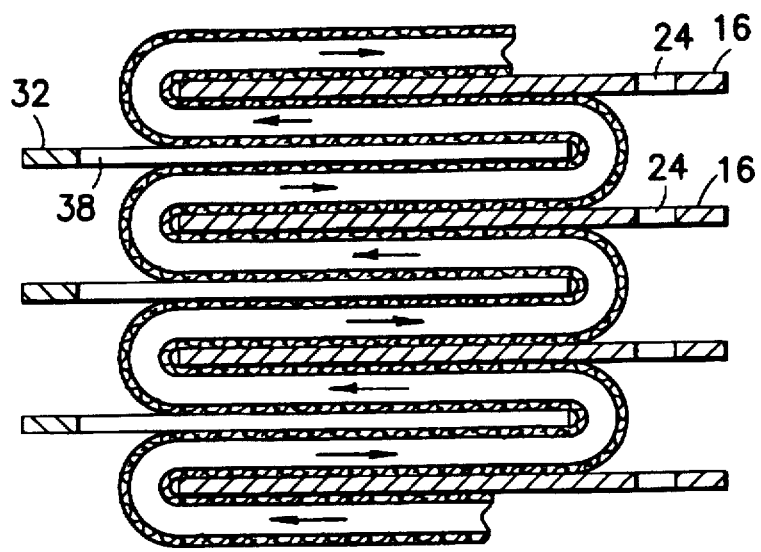
FIG. 6 is a view similar to FIG. 5 but showing the bag partly inflated.

As the fourth and fifth folding combs 60, 62 move farther inward, they tuck the excess portions EP into spaces between the accordion pleats AP (shown in FIGS. 5 and 6). The pleats AP, because the cushion is partially inflated, yield to permit the entrance of the excess portions EP. Afterward the air within the cushion A may be bled off to permit subsequent compaction of the folded cushion.

The situation is now as shown from above in FIG. 7 with a package P of the folded cushion (see also FIG. 9) formed, the various folding combs 10, 12, 30, 60 and 62 being still in the position shown.

Figure 8:
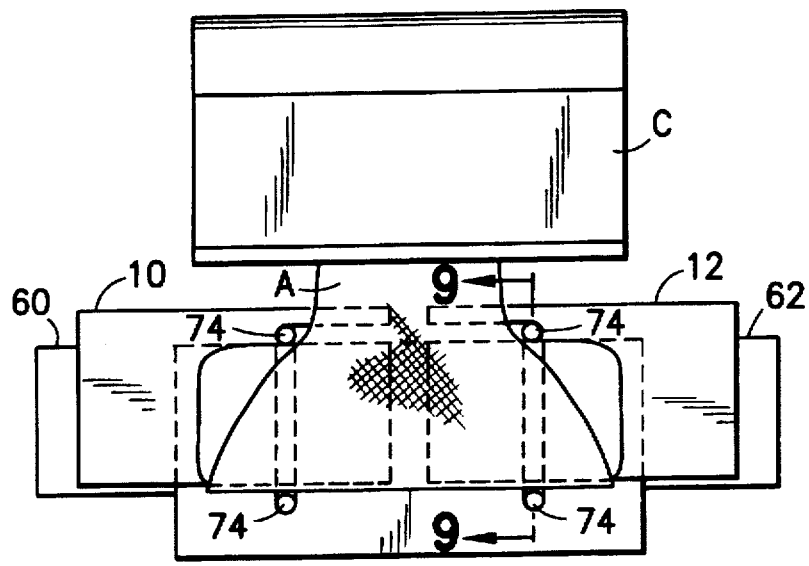
FIG. 8 is a top plan schematic view of an airbag assembly as in FIG. 7 with the strip-carrying pins in place but the pressing plates not shown.
Figure 9:
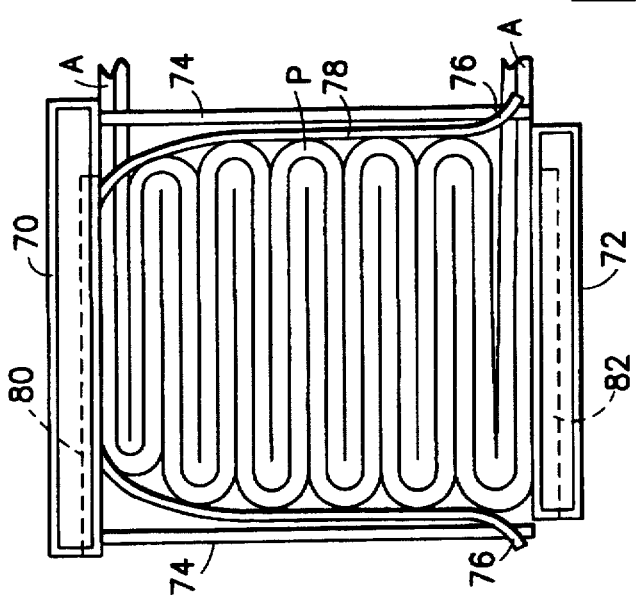
FIG. 9 is an enlarged sectional view taken on the line 9—9 of FIG. 8 with the compacting plates and pins in place, but after the folding combs are withdrawn.

As shown in FIG. 9, the compacting operation involves the bringing together from above and below of the pressure plates 70, 72. The upper pressure plate 70 has spaced pins 74 rigidly extending vertically downward. The lower ends of these pins are formed with openings 76 which receive and secure respectively the opposite ends of elastic compacting strips 78. When the plate 70 is brought down, the pins 74 fit through the exposed ends 22a, 24a, 36a and 38a of slots 22, 24 and 36, 38 (FIG. 8). Strips 78 are stretched to inverted U-shape (FIG. 9) over the folded away cushion package P.

As shown in FIG. 9, plates 70 and 72 are formed in their opposed inner surfaces with transverse recesses 80, 82. With the plates 70, 72 engaging the top and bottom of the folded cushion package P, the folding combs 10, 20, 30 60 and 62 are withdrawn in the opposite directions respectively from which they entered the package (FIG. 9). Even though the pins 74 extend vertically closely along opposite sides of the package P, the combs are able to withdraw: the slots 22, 24 and 36, 38 are purposely formed in directions and of shapes to permit withdrawal of the first, second and third combs 10, 12 and 30. The fourth and fifth combs 30, 62 did not penetrate the package P as far as the pins 74, and the pins 74 do not impede their withdrawal. With the combs withdrawn, the plates 70, 72 compress the package P. At the end of the compacting step the package P is more tightly packed than at the beginning.

While the plates 14, 16, 32, 64 and 66 of the various folding combs have been described and depicted as moving in unison with the other plates in the same comb, it is envisioned that the plates may be individually moved in sequence so as to distribute over time the stress in the combs and on the fabric being worked. As another expedient, the leading edges of some of the plates may be staggered forward from their adjacent plates to distribute the stress.

Figure 10:
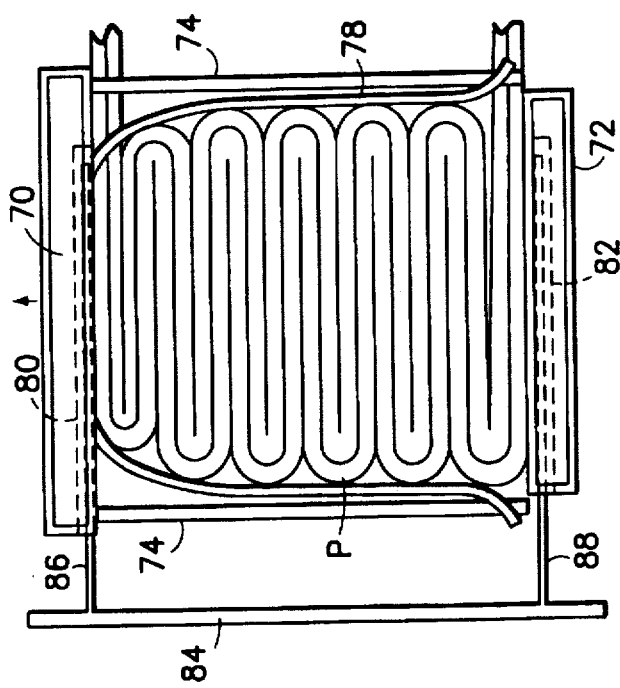
FIG. 10 is a view similar to FIG. 9 but with the inserting blades in place.
Figure 11:
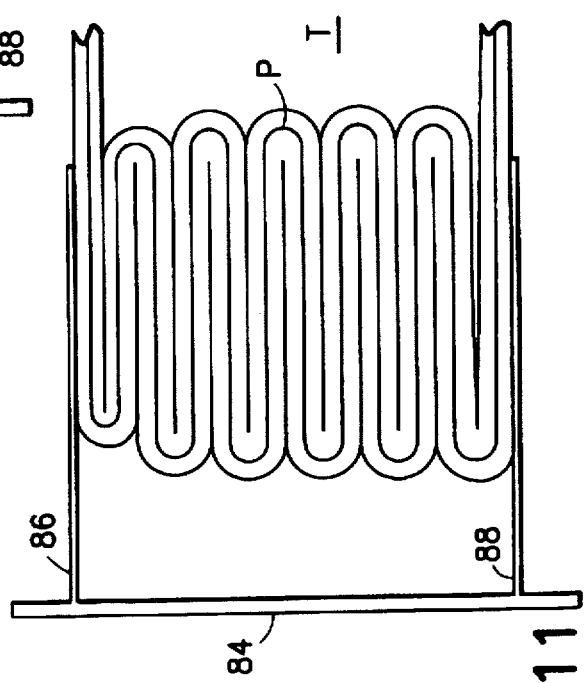
FIG. 11 is a view similar to FIG. 10 but with the compacting plates and pins withdrawn.

An insertion yoke 84 (FIG. 10) having spaced horizontal insertion blades 86, 88 moves inward of the compacting plates 70, 72 as shown in FIG. 10. The blades 86, 88 extend inward of the plate recesses 80, 82 respectively. At this point the compacting plates 70, 72 are withdrawn, leaving the package P supported and straddled by the insertion blades 86, 88 (FIG. 11). A slight amount of air is now introduced into the bag—to about 20 psi—to keep the throat T of the cushion A open.

As shown in FIG. 12, the insertion yoke 84 moves rightward carrying the package P into the canister C. The throat T accordion pleats over the blades 86, 88 as shown.

Figure 13:
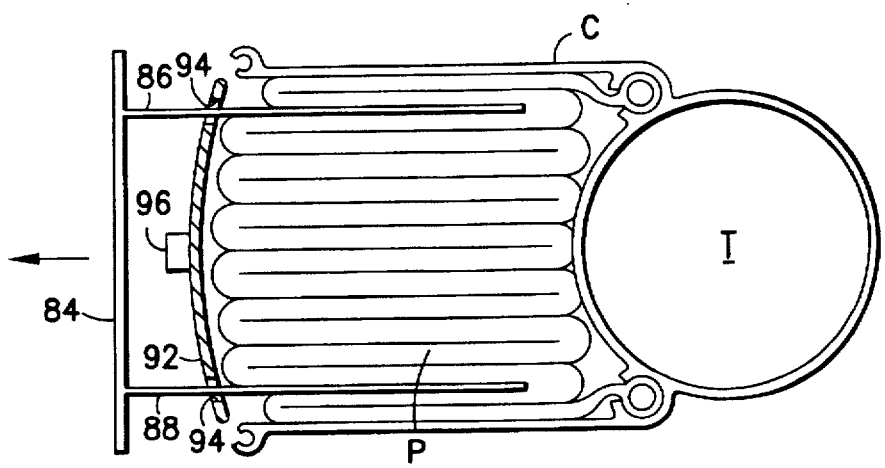
FIG. 13 is a view similar to FIG. 12 but showing the temporary pressure flap riding on the insertion blades.
Figure 14:
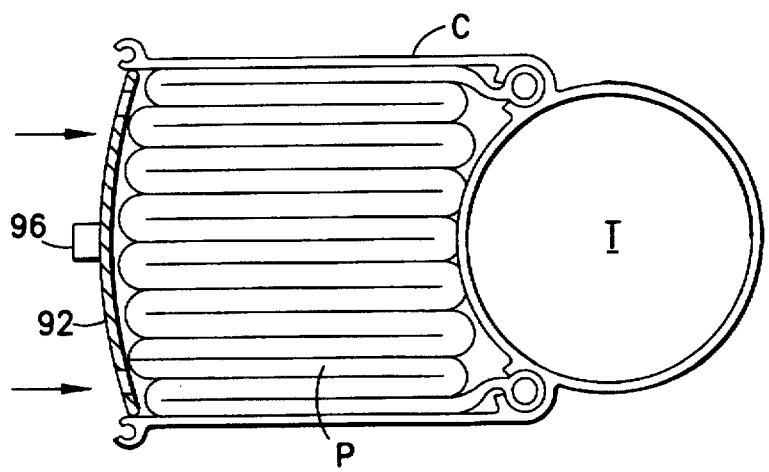
FIG. 14 is a view similar to FIG. 13 but showing the temporary pressure flap pushed toward the folded package and positioned between the walls of the canister.

In the next step in the process (FIG. 13), a temporary slotted pressure flap 92 formed with longitudinal slots 94, is slid over the insertion blades 86, 88 and is pressed against the package P as the insertion yoke 84 is removed. The inward pressure against the flap 92, is illustrated by force arrows in the situation shown in FIG. 14. The folded package P is thus neatly held in the canister C.

Figure 15:
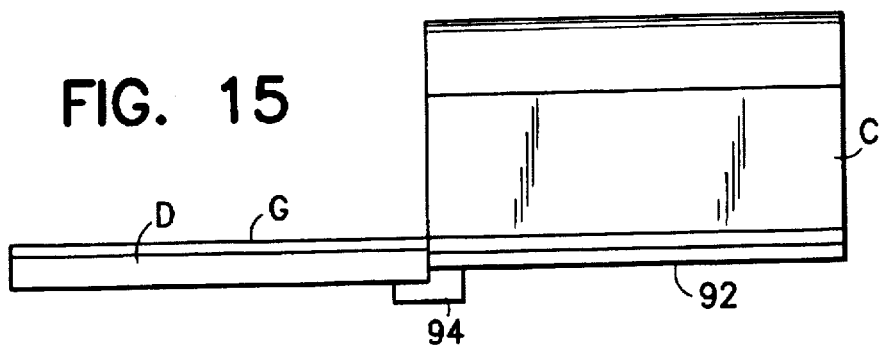
FIG. 15 is a top view showing the temporary pressure flap engaging a permanent dust cover.
Figure 16:
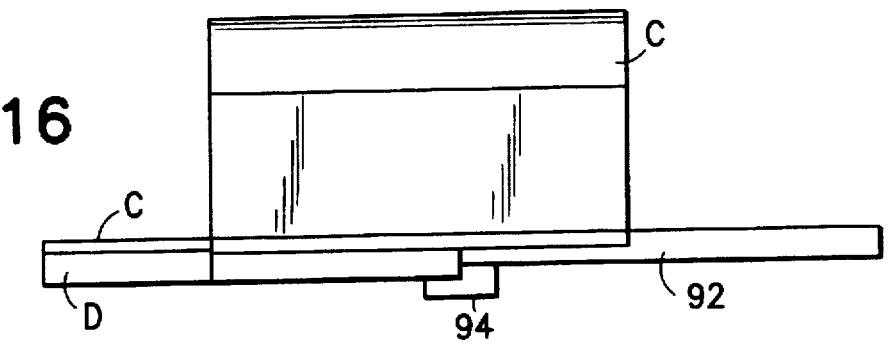
FIG. 16 shows the temporary pressure flap drawing the permanent dust cover toward its final position.
Figure 17:
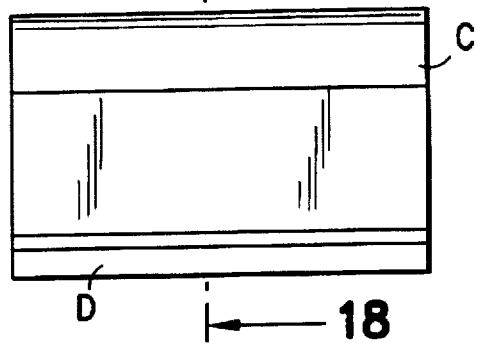
FIG. 17 shows the permanent dust cover in final position with the temporary pressure flap removed.
Figure 18:
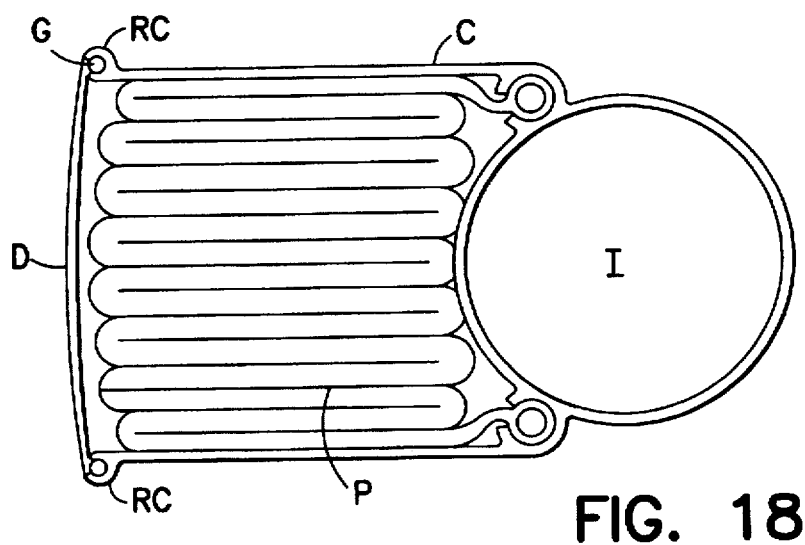
FIG. 18 is a sectional view taken on the line 18—18 of FIG. 17 showing the packed canister.

As shown in FIG. 15, the temporary pressure flap 92 carries at one end (the left end) a clip 94 (indicated only schematically) which engages an end of the final dust cover D. The temporary pressure flap 92 is withdrawn rightwardly, dragging in that direction the permanent dust cover D having thicker upper and lower edges G, the edges G fitting (FIG. 18) into C-shaped, slotted extruded outwardly facing retainer channels RC. The clip 94 is released. FIG. 18 shows the final loaded canister C having the folded airbag cushion package P thereinside.

Correlating the broader language used in the summary of the invention above with the description as related to the drawings of the preferred embodiment, the invention is a method for folding an inflatable airbag cushion A having an inflation opening T therein, the cushion secured at hems H (FIG. 2) about the inflation opening to a canister C, the cushion comprising a main panel M having opposite side peripheries MP margins B and extending forward from the canister to a face portion FM having a width WF and top and bottom boundary lines TL and BL, and back to the canister C, and side panels S secured to the respective side peripheries MP of the main panel M.

The method comprises the steps of gripping the main panel at spaced points 50, 52, 54 and 56 along the top TL and bottom BL boundary lines of the face panel portion FM and pulling the face panel portion FM generally taut and in a direction away from the canister C, folding the face portion FM and side panel portions S adjacent the face panel, FM into accordion pleats AP (FIG. 5) parallel to the width WF of the face portion FM and leaving excess portions EP of the cushion at either end of the pleats, (FIG. 4). The invention further comprises tucking the excess portions EP inbetween the respective accordion pleats AP to form a folded package P of the airbag cushion, and inserting the folded package P into the canister C.

The invention may include the additional step of partially inflating the cushion (FIG. 5) between the steps of folding the face portion FM and adjoining side portions S into accordion pleats AP and tucking in the excess portions EP. The package P may also be compressed before inserting it into the canister C and adding a dust cover D to the front of the canister.

By virtue of the process described, the folding of an airbag cushion may be readily accomplished. Time and labor are saved and a superior product results. This new cushion fold is designed to more evenly distribute the stress and strain loadings over the cushion material, throat, and seams. The fold is not reliant on a "prescribed sequence" of unfolding operations, but rather, the whole cushion unfolds as an airbag in an outward motion in the direction of the occupant and outward to the sides at the same time. This eliminates or greatly reduces the oscillation of the airbag cushion during deployment and decreases the time for the airbag cushion to be filled and in position to protect the occupant.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

We claim:

1. A method for folding an inflatable airbag cushion having an inflation opening therein, the cushion secured about the inflation opening to a canister, the cushion comprising a main panel having opposite side margins and extending forward from the canister to a face panel portion, having a width and a periphery, and back to the canister, and side panels secured to respective side margins of the main panel, said folding method comprising the steps of:

a. gripping the main panel at spaced points about the periphery of the face panel portion and arranging the face panel portion generally taut and in a direction away from the canister;

b. folding the face panel portion and side panel portions adjacent the face panel into accordion pleats parallel to the width of the front face portion and leaving excess portions of the cushion at either end of the pleats;

c. tucking the excess portions inbetween the respective accordion pleats to form a folded package of the airbag cushion; and d. inserting the folded package into the canister.

2. A method as claimed in claim 1 including the additional step of partially inflating the cushion between the steps of folding the face panel portion and adjoining side portions into accordion pleats and tucking in the excess portions.

3. A method as claimed in claim 1 including the additional step of compressing the folded package prior to inserting it into the canister.

4. A method as claimed in claim 1 including the additional step, after inserting the folded package in the canister of attaching a dust cover to the front of the canister.

5. A method for folding an inflatable airbag cushion disposed in a rigid canister having opposite sidewalls and a rear wall formed with an inflation fluid opening, the cushion having side panels and a main panel joined to edges of the side panels, the main and side panels defining an open mouth of the cushion anchored in the canister about the inflation fluid opening, the method comprising the steps of:

a. gripping the main panel from top and bottom at spaced-apart locations on the main panel, all locations being spaced from the canister, and pulling the main panel so that a generally planar front face portion is formed and the side panels extend in generally planar shape outwardly from the canister;

b. moving first and second folding combs from opposite sides of the cushion inward to indent the respective side panels, the first and second folding combs each comprising groups of parallel vertically aligned, spaced, horizontal plates;

c. moving from the front of the cushion toward the canister a third folding comb comprising a group of parallel vertically aligned, spaced, horizontal plates and engaging the front face portion to interdigitate the plates of the third folding combs with the plates of the first and second folding combs with affected portions of the face portion and side panels inbetween said plates, thereby shaping the affected portions into accordion folds;

d. moving fourth and fifth folding combs inward from opposite sides of the cushion, each of the fourth and fifth folding combs comprising groups of parallel vertically aligned, spaced, horizontal plates, engaging with the plates of the fourth and fifth folding combs remaining portions of the side panels and main panel remaining to the outside of the interdigitated first, second and third folding combs, and interdigitating the plates of the fourth and fifth folding combs with the plates of the first, second and third folding combs thereby inserting between the accordion folds additional folds of said remaining portions to form a folded package of the airbag cushion;

e. withdrawing all folding combs from the folded package of the cushion; and f. moving the folded package of the airbag cushion in a rearward direction into the canister.

6. A method as claimed in claim 5 including the additional steps, after interdigitating the plates of the first, second and third folding combs, of retracting the third folding comb slightly and partially inflating the cushion, and deflating the cushion after inserting the remaining portions.

7. A method as claimed in claim 6 including the additional step, after deflating the cushion, of compacting the package from directions above and below the package.

8. A method as claimed in claim 7 including the additional step, after inserting the package into the canister, of installing a dust cover on the front of the canister.

9. A folded inflatable airbag cushion in a canister produced by the method of claim 1.

10. A folded inflatable airbag cushion in a canister produced by the method of claim 5.

* * * * *